United States Patent
Liu et al.

(10) Patent No.: US 10,762,305 B2
(45) Date of Patent: Sep. 1, 2020

(54) METHOD FOR GENERATING CHATTING DATA BASED ON ARTIFICIAL INTELLIGENCE, COMPUTER DEVICE AND COMPUTER-READABLE STORAGE MEDIUM

(71) Applicant: BEIJING BAIDU NETCOM SCIENCE AND TECHNOLOGY CO., LTD., Beijing (CN)

(72) Inventors: Yi Liu, Beijing (CN); Daxiang Dong, Beijing (CN); Dianhai Yu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 178 days.

(21) Appl. No.: 16/005,779

(22) Filed: Jun. 12, 2018

(65) Prior Publication Data

US 2018/0357225 A1 Dec. 13, 2018

(30) Foreign Application Priority Data

Jun. 13, 2017 (CN) .......................... 2017 1 0444259

(51) Int. Cl.
*G06F 16/35* (2019.01)
*G06F 40/56* (2020.01)
*H04L 12/58* (2006.01)
*G06F 17/18* (2006.01)
*G06N 3/04* (2006.01)
(Continued)

(52) U.S. Cl.
CPC .............. *G06F 40/56* (2020.01); *G06F 17/18* (2013.01); *G06F 40/279* (2020.01); *G06F 40/35* (2020.01);
(Continued)

(58) Field of Classification Search
CPC ............................ G06F 16/35; G06F 16/5846
See application file for complete search history.

(56) References Cited

U.S. PATENT DOCUMENTS

2003/0074368 A1* 4/2003 Schuetze ............... G06F 16/355
2016/0350658 A1 12/2016 Kedia et al.
2019/0341021 A1* 11/2019 Shang .................... G06N 3/084

FOREIGN PATENT DOCUMENTS

CN 104598445 5/2015
CN 105512228 4/2016
(Continued)

OTHER PUBLICATIONS

Vaswani, et al., "Attention Is All You Need," NIPS Proceedings, 31st Conference on Neural Information Processing Systems, 2017. (Year: 2017).*

(Continued)

*Primary Examiner* — Feng-Tzer Tzeng
(74) *Attorney, Agent, or Firm* — Hodgson Russ LLP

(57) ABSTRACT

Embodiments of the present disclosure relate to a method for generating chatting data based on AI, a computer device and a computer-readable storage medium. The method includes: converting chatting data inputted by a user into an input word sequence; converting a tag of the user into a tag word sequence; based on a preset encoding-decoding model with an attention model, predicting according to the input word sequence and the tag word sequence to obtain a target word sequence; and converting the target word sequence into reply data of the chatting data.

12 Claims, 4 Drawing Sheets

(51) Int. Cl.

| | | |
|---|---|---|
| *G06N 3/08* | (2006.01) | |
| *G06N 3/00* | (2006.01) | |
| *G06F 40/35* | (2020.01) | |
| *G06F 40/49* | (2020.01) | |
| *G06F 40/279* | (2020.01) | |
| *G06N 5/04* | (2006.01) | |
| *G06F 16/583* | (2019.01) | |

(52) U.S. Cl.
CPC ............ *G06F 40/49* (2020.01); *G06N 3/006* (2013.01); *G06N 3/0445* (2013.01); *G06N 3/0454* (2013.01); *G06N 3/08* (2013.01); *H04L 51/02* (2013.01); *G06F 16/35* (2019.01); *G06F 16/5846* (2019.01); *G06N 5/041* (2013.01)

(56) References Cited

FOREIGN PATENT DOCUMENTS

| CN | 105955964 | 9/2016 |
|---|---|---|
| CN | 106126596 | 11/2016 |

OTHER PUBLICATIONS

M. Peters, "Deep contextualized word representations," 2018. (Year: 2018).*

"Deep Learning Methods (9) Attention Model in Natural Language Processing," Blog, Feb. 2017, <https://blog.csdn.net/xbinworld/article/details/54607525>.

Wang, "Learning to Extract Conditional Knowledge for Question Answering using Dialogue," South China University of Technology, vera-Izz's blog, Jun. 2017, 3 pages.

Su, "Research and Implement of Face Recognition Based on Neural Network," Dissertation, South China University of Technology, May 2013, 73 pages.

Sun, "The Research of understanding question sentence and personalized recommendation algorithm in the Automatic-answering system," Jan. 2011, Masters Thesis, Nanjing University of Information Science & Technology, pp. 1-68.

SIPO, First Office Action for CN Application No. 201710444259.9, dated Jun. 28, 2019.

SIPO, Second Office Action for CN Application No. 201710444259.9, dated Dec. 18, 2019.

* cited by examiner

METHOD FOR GENERATING CHATTING DATA BASED ON ARTIFICIAL INTELLIGENCE, COMPUTER DEVICE AND COMPUTER-READABLE STORAGE MEDIUM

CROSS REFERENCE TO RELATED APPLICATION

This application is based on and claims priority of Chinese Patent Application No. 201710444259.9 filed on Jun. 13, 2017, the entire contents of which are incorporated herein by reference.

TECHNICAL FIELD

Embodiments of the present disclosure relate to a field of intelligent chatting technologies, and more particularly, to a method for generating chatting data based on artificial intelligence, a computer device and a computer-readable storage medium.

BACKGROUND

Artificial intelligence (AI) is a new technical science studying and developing theories, methods, techniques and application systems for simulating, extending and expanding human intelligence. AI is a branch of computer science, which attempts to know the essence of intelligence and to produce an intelligent robot capable of acting as a human. The researches in this field include robots, speech recognition, image recognition, natural language processing and expert systems, etc.

The intelligent chatting represents a process of replying intelligently by a machine to a sentence inputted by a user. However, in the related art, the number of chatting rounds on the intelligent chatting is relatively low.

SUMMARY

In a first aspect, embodiments of the present disclosure provide a method for generating chatting data based on AI. The method includes: converting chatting data inputted by a user into an input word sequence; converting a tag of the user into a tag word sequence; based on a preset encoding-decoding model with an attention model, predicting according to the input word sequence and the tag word sequence to obtain a target word sequence; and converting the target word sequence into reply data of the chatting data.

In a second aspect, embodiments of the present disclosure provide a computer device. The computer device includes: a processor, a memory and computer programs stored in the memory and executable by the processor. The processor is configured to execute the computer programs to realize the above method.

In a third aspect, embodiments of the present disclosure provide a computer-readable storage medium having computer programs stored therein. When the computer programs are executed by a processor, the above method is realized.

DETAILED DESCRIPTION

The present disclosure will be described in detail below with reference to the accompanying drawings and the embodiments. It should be understood that, the specific embodiments described herein are only used to explain the present disclosure rather than to limit the present disclosure. In addition, it should also be noted that, for the convenience of description, only some but not all structures related to the present disclosure are illustrated in the accompanying drawings.

Figure 1:
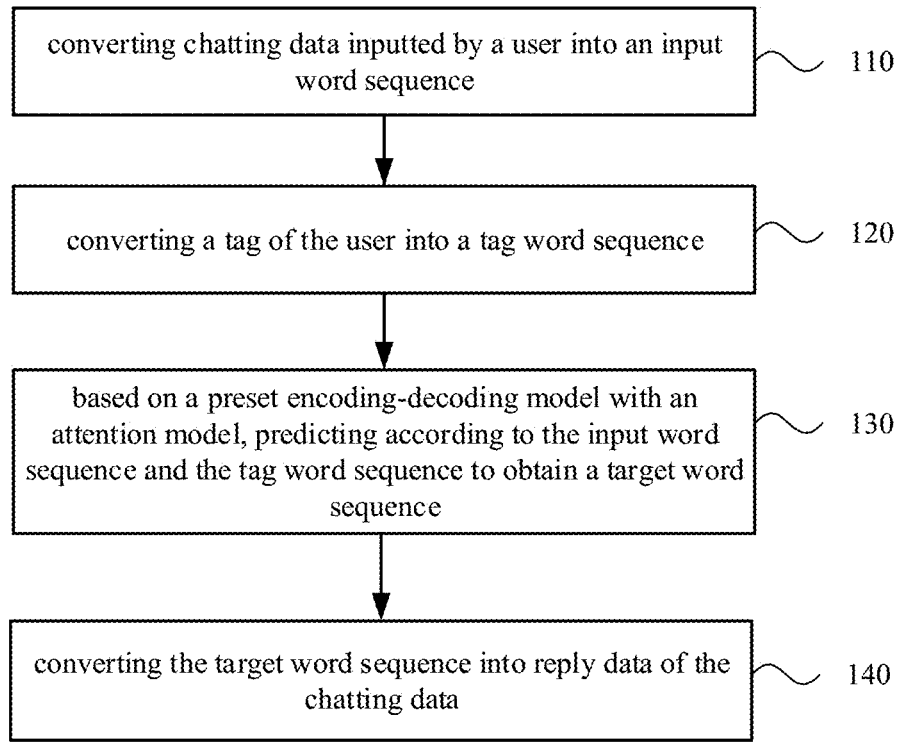
FIG. 1 is a flow chart of a method for generating chatting data based on AI according to embodiments of the present disclosure.

FIG. 1 is a flow chart of a method for generating chatting data based on AI according to embodiments of the present disclosure. The embodiment may be applicable to a situation where a user chats with a machine. The method may be executed by a server or a terminal running a chatting system. The method includes the following acts in blocks.

In block 110, chatting data inputted by a user is converted into an input word sequence.

In some embodiments of the present disclosure, the chatting data may be text-formatted data inputted by the user or audio-formatted data inputted by the user. If the method illustrated in this embodiment is executed by the terminal, the terminal may obtain the chatting data inputted by the user through an input device of the terminal. If the method illustrated in this embodiment is executed by the server, first, the terminal may obtain the chatting data inputted by the user through the input device of the terminal, and then transmit the chatting data to the server through network. If the chatting data is the audio-formatted data, the audio-formatted data is converted into the text-formatted data. The audio-formatted data may be converted into the text-formatted data by the terminal or the server having a conversion function.

After the text-formatted data is obtained, the text-formatted data may be converted into machine-readable data. In some embodiments of the present disclosure, the text-formatted data may be converted into a vector representation (or a vector) as the input word sequence based on a preset vector conversion model. The preset vector conversion model may be a Vector Space Model (VSM), for example. About converting the text-formatted data into the vector by the preset vector conversion model, the reference should be made to the related art and will not be repeated here.

In block 120, a tag of the user is converted into a tag word sequence.

In some embodiments of the present disclosure, the tag of the user may be determined based on user's behavior characteristics. For example, a user favorite exercise and a user exercise time period are determined based on user exercise parameters, and the tag of the user is determined based on the user favorite exercise and the user exercise time period. For another example, based on applications installed by the user, the type of application required by the user is determined, and the tag of the user is determined based on the type of application.

Similarly, the preset vector conversion model may also be used to convert the tag of the user into a vector representation (or a vector) as the tag word sequence.

In block 130, based on a preset encoding-decoding model with an attention model, it predicts according to the input word sequence and the tag word sequence to obtain a target word sequence.

In some embodiments of the present disclosure, the preset encoding-decoding model with the attention model may include an encoder, the attention model and a decoder. After the input word sequence and the tag word sequence are inputted into the preset encoding-decoding model, the input word sequence is encoded and the tag word sequence is encoded. The encoded data is input into the attention model. Then the data outputted by the attention model is decoded to obtain the target word sequence. Therefore, since the encoded tag word sequence may be applied with the attention model, the obtained target word sequence has tag features, i.e., keyword features.

In block 140, the target word sequence is converted into reply data of the chatting data.

In some embodiments of the present disclosure, block 130 may include block 131, block 132, block 133, block 134, block 135, block 136 and block 137.

In block 131, the input word sequence is encoded to obtain a first corpus sequence.

In block 132, the tag word sequence is encoded to obtain a reference corpus sequence.

The input word sequence and the tag word sequence may be separately encoded by different encoders or the same encoder in the preset encoding-decoding model. The execution of acts in block 131 and block 132 is in no particular order.

In block 133, a preset word in the first corpus sequence is determined as an initial word.

In block 134, first context information corresponding to the initial word is determined based on the first corpus sequence.

In detail, first weight information corresponding to the initial word is determined, and weighted sum is performed on the first corpus sequence based on the first weight information.

In block 135, second context information corresponding to the initial word is determined based on the reference corpus sequence.

In detail, second weight information corresponding to the initial word is determined, and weighted sum is performed on the reference corpus sequence based on the second weight information.

The execution of acts in block 134 and block 135 is in no particular order.

In block 136, a target word is determined based on the initial word, the first context information and the second context information.

In detail, the initial word, the first context information and the second context information are inputted into the attention model to obtain hidden layer information. The hidden layer information is projected into a word list space by linear transformation. It predicts a probability that a first word in the word list space is a next word, the first word being any one word in the word list space. The target word is determined based on the probability.

In block 137, when the target word does not meet a cut-off condition, it iterates by using the target word as the initial word to return the act in block 134.

In some embodiments of the present disclosure, the cut-off condition may include: the target word being a preset ending word; and/or, the number of the target words that have been obtained reaching a preset length.

In some embodiments of the present disclosure, the word list space is obtained by acts of: obtain a plurality of conversation records; performing word segmentation on each of sentences in the plurality of conversation records to obtain a plurality of segmentation words; obtaining a probability that each of the plurality of segmentation words appears; and determining the word list space based on the probability that each of the plurality of segmentation words appears.

The following describes the embodiments of the present disclosure by way of example.

The preset encoding-decoding model with the attention model may be established by training. The principle of training the model is the same with the principle of predicting based on the model. Therefore, the description on the principle of training the model is also applicable to the principle of predicting based on the model. The description on the principle of predicting based on the model is also applicable to the principle of training the model.

When training the model, training data should be collected in advance. For example, training data preparation includes: collecting in advance tags of at least one user and conversation pairs under the tags; generating a tag word list for the tags and generating a conversation-pair word list for the conversation pairs.

In an implementation manner, firstly, a plurality of conversation records of the at least one user are obtained. For example, chatting records of an artificial customer service are read as a corpus. For convenience of description, the chatting data inputted by the user is defined as a first corpus, and correspondingly the chatting data replied by the customer service is defined as a second corpus.

Secondly, word segmentation is performed on the first corpus corresponding to each of the conversation pairs in the conversation records to obtain the training input data. Word segmentation is performed on the second corpus corresponding to each of the conversation pairs in the conversation records to obtain the training output data. The manner of obtaining the training input data is the same with the manner of obtaining the training output data. In detail, the word segmentation is performed on the first or second corpus corresponding to each of the conversation pairs in the conversation records to obtain a plurality of segmentation words correspondingly. For example, the corpus is analyzed one by one by using the word segmentation tool, and the word segmentation is performed on each sentence in turn. The word segmentation tool may split a sentence into separate words. For example, a Chinese sentence "我好久没有运动了 (I have not exercised for a long time)", after the word segmentation, five words, "我(I)", "好久(long time)", "没有(not)", ""运动(exercise)" and "了(modal particle)" may be obtained.

Thirdly, a probability that each of the plurality of segmentation words appears is obtained.

After separate words are obtained, a frequency or number of times that each word appears may be obtained.

Finally, the word list space is determined based on the probability value that each of the plurality of segmentation words appears.

N key words with the best frequency or the best number of times are added into the word list. A value of N can be selected based on application requirements. The higher the N is, the higher a coverage rate of recognizable words is, but the lower efficiency of training and predicting is. The word that is not added to the word list is identified by a preset identifier. The preset identifier may be "UNKNOWN". In addition to the N key words and the UNKNOWN word, some words are tagged as "START" and "END". The "START" word is an initial word of the decoder, and the "END" word is a terminator word of the decoder. The word list includes the N key words, the "UNKNOWN" word, the "START" word and the "END" word. Based on needs of the words in the word list, the conversation pairs in the corpus are converted into serial numbers one by one.

Similarly, for the tag of the user, the word list is also generated (assuming a size of the word list of the tag of the user is M), an unregistered word is tagged by UNKNOWN, and some words are tagged by START and END. At this point, the training data is ready.

The preset encoding-decoding model with the attention model may be trained using the training data obtained above. After that, the conversation may be generated by using this encoding-decoding model with the attention model.

After converting the chatting data inputted by the user into the input word sequence, the encoder in the encoding-decoding model with the attention model may encode the input word sequence to obtain the first corpus sequence. Similarly, after converting the tag of the user into the tag word sequence, the encoder in the encoding-decoding model with the attention model may encode the tag word sequence to obtain the reference corpus sequence.

In some embodiments of the present disclosure, the preset encoding-decoding model with the attention model may include two recurrent neural networks. The encoder includes one recurrent neural network. The attention model includes one recurrent neural network. The decoder uses a softmax operation to decode. The recurrent neural network may be a LSTM (Long Short-Word Memory) recurrent neural network or a GRU (Gated Recurrent Unit) recurrent neural network. The LSTM recurrent neural network is taken as an example for convenience in illustration.

Figure 2:
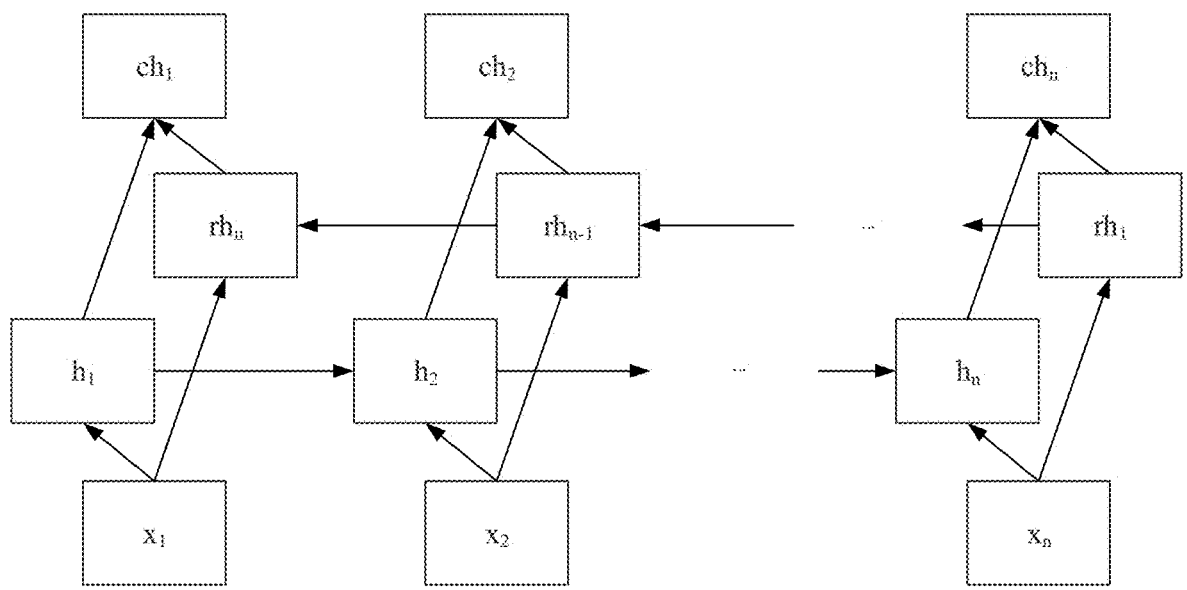
FIG. 2 is a schematic diagram illustrating an encoding algorithm according to embodiments of the present disclosure.
Figure 3:
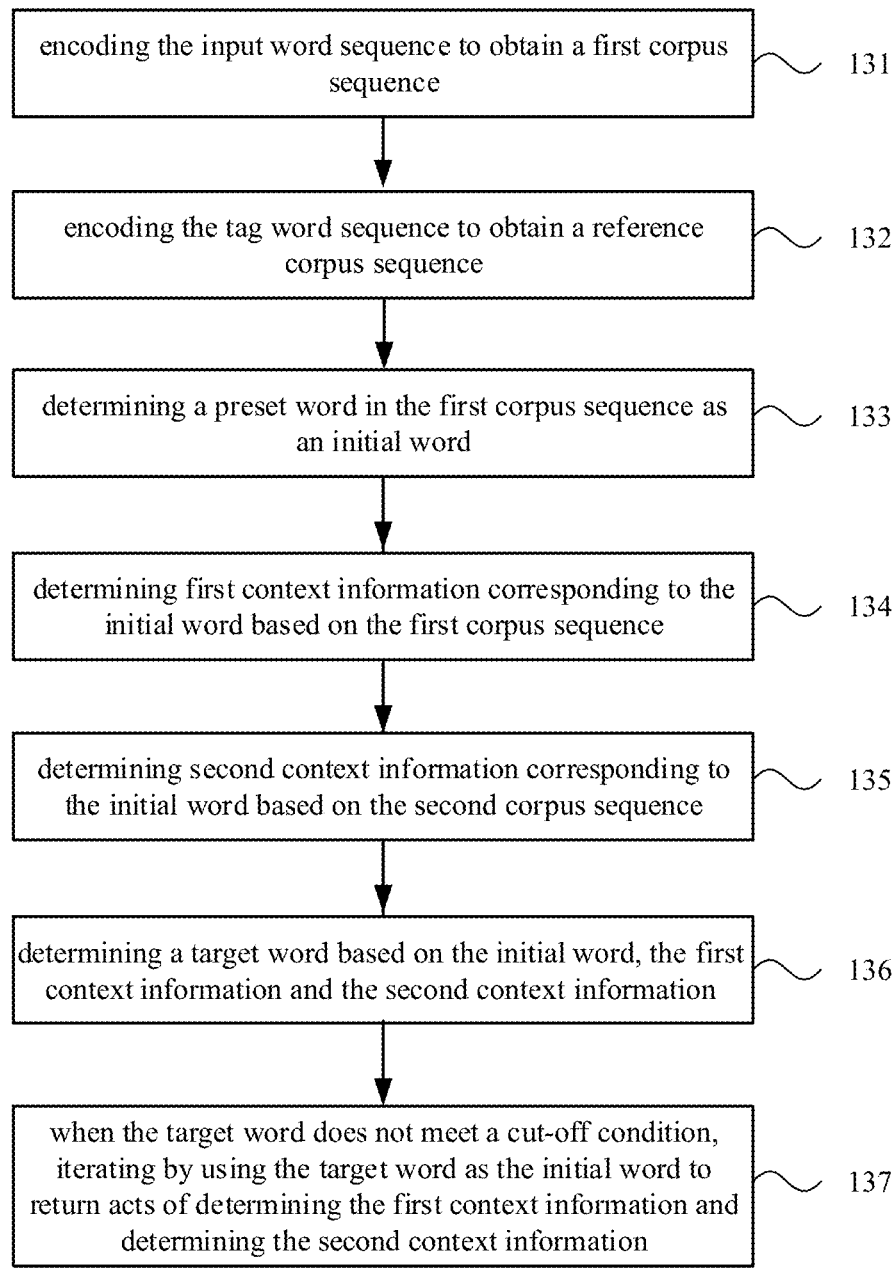
FIG. 3 is a flow chart of a method for generating chatting data based on AI according to embodiments of the present disclosure.

In detail, in the recurrent neural network, a hidden layer state at a current time is determined by a hidden layer state at a previous time and an input at the current time. The encoding algorithm is illustrated in FIG. 2. $x_i$, i=1,2, ..., n represent the words obtained by the word segmentation on the chatting sentence inputted by the user. $x_1$ to $x_n$ forms the input word sequence.

At any time t, $x_t$ is calculated by a formula 1 of:

$i_t = \sigma(W_i x_t + U_i h_{t-1} + b_i)$ $f_t = \sigma(W_f x_t + U_f h_{t-1} + b_f)$ $o_t = \sigma(W_o x_t + U_o h_{t-1} + b_o)$ $\tilde{c}_t = \tanh(W_c x_t + U_c h_{t-1} + b_c)$ $c_t = i_t \odot \tilde{c}_t + f_c \odot c_{t-1}$ $h_t = o_t \odot c_t$ where, $h_{t-1}$ represent a hidden layer state at time t−1; $b_i$, $b_f$, $b_o$ and $b_c$ represent offset items; $i_t$ represents an input layer; $f_t$ represents a forget gate, in which each element in the forget gate has a range of [0,1], and the forget gate determines how much the hidden layer state of the previous time should be retained; $o_t$ represents an output gate, in which each element in the output gate has a range of [0,1], and the output gate determines the current output; $\odot$ represents a multidimensional multiplication operation; $W_i$, $W_f$, $W_o$ and $W_c$ form a matrix W; $U_i$, $U_f$, $U_o$ and $U_c$ form a matrix U. The matrixes W and U are parameters corresponding to different gates (for example, f, o) in the LSTM, states, and $\tilde{c}$. The matrixes W and U may achieve desired effect through training. σ represents a Sigmoid function of:

$$\sigma(x) = \frac{1}{1+e^{-x}}$$

The above formula may realize the LSTM. That is, through "gate" mechanism, the information $x_t$ on the current word and the information $h_{t-1}$ on the preceding word sequence are comprehensively modeled to generate the information $h_t$ on the current word sequence. The obtained information h on each word sequence is the result of the encoding operation.

Further, in order to make the LSTM more plentiful and accurate, after processing the word sequence in a forward direction to generate $h_1$, $h_2$, ..., $h_n$, in a reverse direction, the same operation is performed to process the word sequence to generate $rh_1$, $rh_2$, ..., $rh_n$. Then, $h_t$ and $rh_{n-t}$ at the corresponding positions are spliced to form an optimized output $ch_t$. The final encoding sequence may be $ch_1$, $ch_2$, $ch_n$, which is used as the first corpus sequence.

Similarly, the reference corpus sequence may also be obtained using the above algorithm. For example, $q_i$, i=0, 1, ..., m for the final encoding sequence may be used as the reference corpus sequence.

At any time t, the attention mode is denoted by a formula 2 of:

$i_t = \sigma(W_i x_t + U_i S_{t-1} + A_i a_t + b_i)$ $f_t = \sigma(W_f x_t + U_f S_{t-1} + A_f a_t + b_f)$ $o_t = \sigma(W_o x_t + U_o S_{t-1} + A_o a_t + b_o)$ $\tilde{c}_t = \tanh(W_c x_t + U_c h_{t-1} + A_c a_t + b_c)$ $c_t = i_t \odot \tilde{c}_t + f_c \odot c_{t-1}$ $s_t = o_t \odot c_t$ where $x_t$ represents the initial word at the current iteration. $S_{t-1}$ represents a hidden layer state obtained from the previous iteration. $a_t$ represents the first context information corresponding to the initial word at the current iteration. The first context information is determined according to the first corpus sequence, in which $a_t$ is calculated by a formula 3 of:

$v_{it} = V_a \tanh(W_a ch_i + U_a s_{t-1})$ $w_{it} = \frac{e^{v_{it}}}{\sum_j e^{v_{jt}}}$ $a_t = \sum_i w_{it} ch_i$ where j represents any word in the word list space, and the range of j is the same as the range of i.

Figure 4:
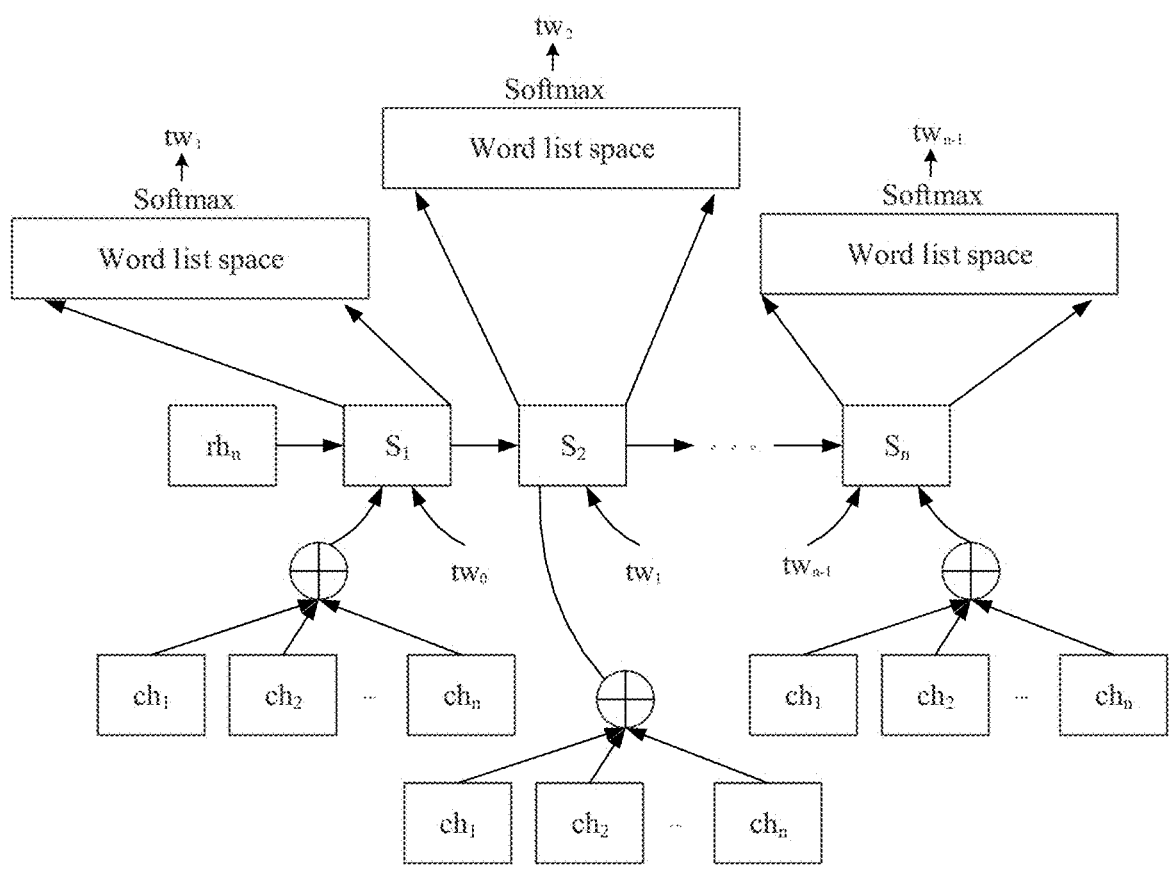
FIG. 4 is a schematic diagram illustrating a decoding algorithm according to embodiments of the present disclosure.

The attention mode is illustrated in FIG. 4. The initial word at the first iteration is $rh_n$, i.e., $x_o$. $s_1$ may be calculated by the above formula. Then $s_1$ is used as the initial word at a next iteration.

In order to combine the attention model with the tag of the user, the second context information corresponding to the initial word may also be obtained according to the reference corpus sequence, as illustrated in a formula 4 of:

$$z_{it} = V_g \tanh(W_g q_i + U_g s_{t-1})$$

$$u_{it} = \frac{e^{z_{it}}}{\sum_j e^{z_{jt}}}$$

$$g_t = \sum_i u_{it} q_i$$

where, $q_i$, i=0,1, ..., m is a vector of the tag of the user. The above formula may generate a corresponding weight $u_{it}$ by comparing the current conversation state with the tag of the user. Then weighting and summing is performed on the tag of the user. In this way, when the decoding end generates the decoding sequence, since the tag of the user relates to the context $s_{t-1}$, the generated conversation may relate to the tag of the user.

Therefore, the formula 2 is updated to a formula 5 of:

$$i_t = \sigma(W_i x_t + U_i s_{t-1} + A_i a_t + G_i g_t + b_i)$$

$$f_t = \sigma(W_f x_t + U_f s_{t-1} + A_f a_t + G_f g_t + b_f)$$

$$o_t = \sigma(W_o x_t + U_o s_{t-1} + A_o a_t + G_o g_t + b_o)$$

$$\hat{c}_t = \tanh(W_c x_t + U_c h_{t-1} + A_c a_t + G_c g_t = b_c)$$

$$c_t = i_t \odot \hat{c}_t + f_c \odot c_{t-1}$$

$$s_t = o_t \odot c_t$$

After that, the hidden layer state $s_t$ is linearly transformed and projected into the word list space, and then the probability $p_i$ of the next word is predicted through the Softmax operation.

In some embodiments of the present disclosure, any conversation firstly passes the encoding end to denote a sequence of $ch_1$, $ch_2$, ..., $ch_n$, and simultaneously a sequence of $q_1$, $q_2$, ..., $q_m$ may be generated based on the tag of the user. Then, the Beam Search algorithm is used in combination with the decoding end to generate a sequence with the highest output probability as the current rely data to input the user. The Beam Search algorithm and the decoding end work together as follows.

First, it is given an initial word START of the sequence as the input $x_0$ at time 0. A probability distribution $P_0$ of the next word may be generated through the decoding end. The K words with the highest probability are selected from $P_0$, and then these K words are taken as the next words in the decoding sequence as the input $x_1$ at time 1. Then, the K groups of the largest candidate words with the previous sequence probability are selected as the candidates of $x_2$ among the K groups of the distributions $P_0$ generated from all the K branches, and the above operation is repeated. If the Beam Search output the sequence ending word END, the Beam Search width is reduced by one and the search continues until the Beam Search width becomes zero or the maximum sequence generation length is reached. The Beam Search width corresponds to the preset sequence length. Finally, one of the K most END-ended sequences is selected as the result.

With the technical solutions provided in the embodiments of the present disclosure, after the input word sequence and the tag word sequence are inputted into the preset encoding-decoding model, the input word sequence is encoded and the tag word sequence is encoded. The encoded data is input into the attention model. Then the data outputted by the attention model is decoded to obtain the target word sequence. Therefore, since the encoded tag word sequence may be applied with the attention model, the obtained target word sequence has tag features, i.e., keyword features. In addition, the target word sequence obtained based on the attention model not only focuses on the context information but also focuses on the tag of the user. Therefore the chatting system may chat with the user according to user's subjective interest and increase the number of chat rounds.

Figure 5:
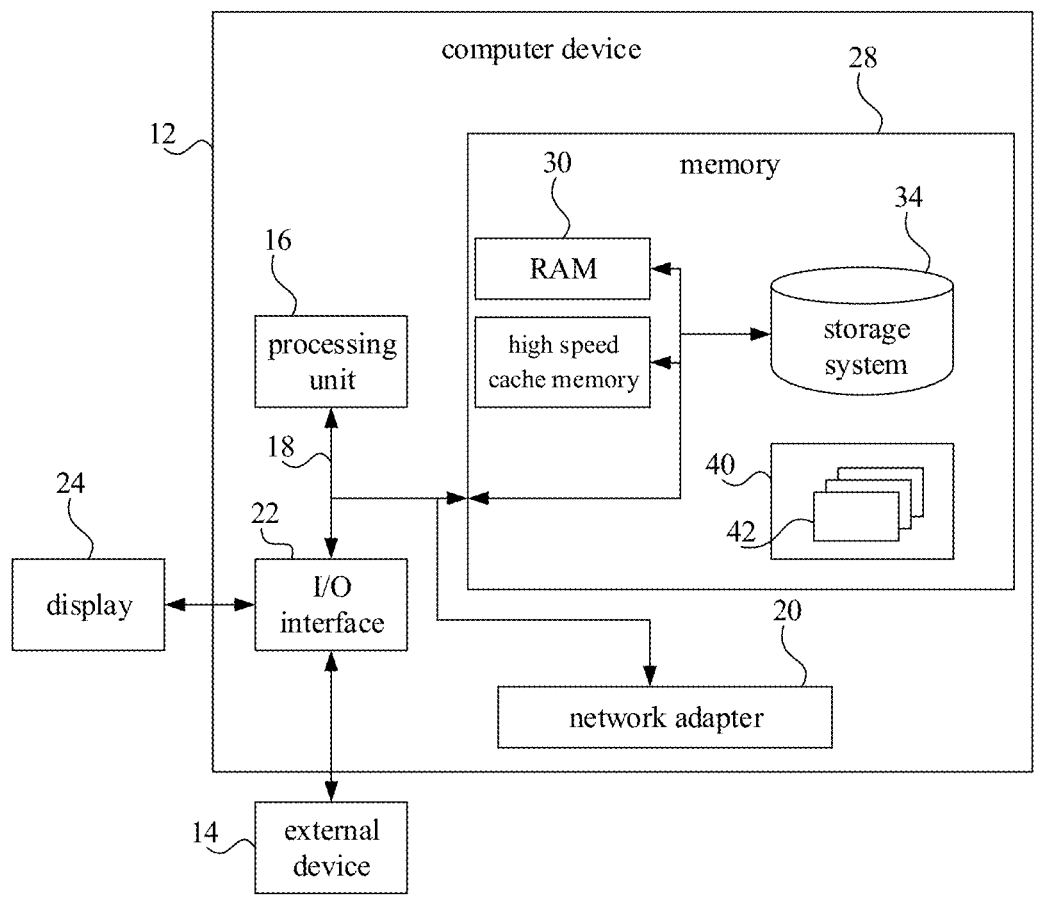
FIG. 5 is a schematic diagram illustrating a computer device according to embodiments of the present disclosure.

FIG. 5 is a schematic diagram illustrating a computer device according to embodiments of the present disclosure. FIG. 5 shows a block diagram of an exemplary computer device 12 that is applicable to realize implementations of the present disclosure. The computer device illustrated as FIG. 5 is merely an example, which does not limit functions and usage scopes of embodiments of the present disclosure.

As illustrated in FIG. 5, the computer device 12 is implemented as a general computation device. Components of the computer device 12 may include but be not limited to: one or more processors or processing units 16; a system memory 28; and a bus 18 connecting various system components including the system memory 28 and the processing units 16.

The bus 18 represents one or more of several types of bus structures, including a memory bus or a memory controller, a peripheral bus, a graphics acceleration port, a processor, or a local bus using any of a variety of bus structures. For example, these structures include, but are not limited to, an Industry Standard Architecture (ISA) bus, a Micro Channel Architecture (MAC) bus, an enhanced ISA bus, a Video Electronics Standards Association (VESA) local bus and a Peripheral Component Interconnection (PCI) bus.

The computer device 12 typically includes a variety of computer system readable media. These media may be any available media accessible by the computer device 12 and includes both volatile and non-volatile media, removable and non-removable media.

The system memory 28 may include a computer system readable medium in the form of volatile memory, such as a random access memory (RAM) 30 and/or a high speed cache memory 32. The computer device 12 may further include other removable or non-removable, volatile or non-volatile computer system storage media. By way of example only, the storage system 34 may be configured to read and write a non-removable and non-volatile magnetic media (not shown in FIG. 5, commonly referred to as a "hard driver"). Although not shown in FIG. 5, a magnetic disk driver for reading from and writing to a removable and non-volatile magnetic disk (such as "floppy disk") and a disk driver for a removable and non-volatile optical disk (such as CD-ROM, DVD-ROM or other optical media) may be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. Such the program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The computer device 12 may also communicate with one or more external devices 14 (such as, a keyboard, a pointing device, a display 24, etc.). Furthermore, the computer device 12 may also communicate with one or more communication devices enabling a user to interact with the computer device 12 and/or other devices (such as a network card, modem, etc.) enabling the computer device 12 to communicate with one or more computer devices. This communication can be performed via the input/output (I/O) interface 22. Also, the computer device 12 may communicate with one or more networks (such as a local area network (LAN), a wide area network (WAN) and/or a public network such as an Internet) through a network adapter 20. As shown in FIG. 5, the network adapter 20 communicates with other modules of the computer device 12 over the bus 18. It should be understood that, although not shown in FIG. 5, other hardware and/or software modules may be used in combination with the computer device 12. The hardware and/or software includes, but is not limited to, microcode, device drivers, redundant processing units, external disk drive arrays, RAID systems, a magnetic tape driver and a data backup storage system.

The processing unit 16 is configured to execute various functional applications and data processing by running programs stored in the system memory 28, for example, implementing the method for generating chatting data based on AI according to embodiments of the present disclosure. The method includes the followings. Chatting data inputted by a user is converted into an input word sequence. A tag of the user is converted into a tag word sequence. Based on a preset encoding-decoding model with an attention model, it predicts according to the input word sequence and the tag word sequence to obtain a target word sequence. The target word sequence is converted into reply data of the chatting data.

Embodiments of the present disclosure further provides a computer readable storage medium having computer programs stored therein. When the computer programs are executed by a processor, the method for generating chatting data based on AI according to embodiments of the present disclosure is executed. The method includes the followings. Chatting data inputted by a user is converted into an input word sequence. A tag of the user is converted into a tag word sequence. Based on a preset encoding-decoding model with an attention model, it predicts according to the input word sequence and the tag word sequence to obtain a target word sequence. The target word sequence is converted into reply data of the chatting data.

Any combination of one or more computer readable media may be adopted for the computer storage medium according to embodiments of the present disclosure. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. Specific examples of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In the present disclosure, the computer readable storage medium may be any tangible medium including or storing programs. The programs may be used by an instruction executable system, apparatus or device, or a combination thereof.

The computer readable signal medium may include a data signal propagating in baseband or as part of a carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable storage medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming languages include an object oriented programming language, such as Java, Smalltalk, C++, as well as a conventional procedural programming language, such as "C" language or similar programming language. The program code may be executed entirely on a user's computer, partly on the user's computer, as a separate software package, partly on the user's computer and partly on a remote computer, or entirely on the remote computer or server. In a case of the remote computer, the remote computer may be connected to the user's computer through any kind of network, including a local area network (LAN), or may be connected to a wide area network (WAN) or an external computer (such as using an Internet service provider to connect over the Internet).

It should be noted that, the above descriptions are only preferred embodiments of the present disclosure and applied technical principles. Those skilled in the art should understand that the present disclosure is not limited to the specific embodiments described herein, and various apparent changes, readjustments and replacements can be made by those skilled in the art without departing from the scope of the present disclosure. Therefore, although the present disclosure has been described in detail by way of the above embodiments, the present disclosure is not limited only to the above embodiments and more other equivalent embodiments may be included without departing from the concept of the present disclosure. However, the scope of the present disclosure is determined by appended claims.

What is claimed is:

1. A method for generating chatting data based on artificial intelligence, comprising:
    converting, with one or more processors, chatting data inputted by a user on a device into an input word sequence;
    converting, with the one or more processors, a tag of the user into a tag word sequence;
    based on a preset encoding-decoding model with an attention model, predicting, with the one or more processors, according to the input word sequence and the tag word sequence to obtain a target word sequence; and
    converting the target word sequence into reply data of the chatting data;
    wherein based on the preset encoding-decoding model with the attention model, predicting according to the input word sequence and the tag word sequence to obtain the target word sequence, comprises:

encoding the input word sequence to obtain a first corpus sequence;
encoding the tag word sequence to obtain a reference corpus sequence;
determining a preset word in the first corpus sequence as an initial word;
determining first context information corresponding to the initial word based on the first corpus sequence;
determining second context information corresponding to the initial word based on the reference corpus sequence;
determining a target word based on the initial word, the first context information and the second context information; and
when the target word does not meet a cut-off condition, iterating by using the target word as the initial word to return acts of determining the first context information and determining the second context information; and
wherein determining the target word based on the initial word, the first context information and the second context information, comprises:
inputting the initial word, the first context information and the second context information into the attention model to obtain hidden layer information;
projecting the hidden layer information into a word list space by linear transformation;
predicting a probability that a first word in the word list space is a next word, the first word being any one word in the word list space; and
determining the target word based on the probability.

2. The method according to claim 1, wherein
determining the first context information corresponding to the initial word based on the first corpus sequence, comprises: determining first weight information corresponding to the initial word, and performing weighted sum on the first corpus sequence based on the first weight information;
determining the second context information corresponding to the initial word based on the reference corpus sequence, comprises: determining second weight information corresponding to the initial word, and performing weighted sum on the reference corpus sequence based on the second weight information.

3. The method according to claim 1, wherein the cut-off condition comprises:
the target word being a preset ending word; and/or,
the number of the target words that have been obtained reaching a preset length.

4. The method according to claim 1, further comprising:
obtaining, with the one or more processors, a plurality of conversation records;
performing, with the one or more processors, word segmentation on each of sentences in the plurality of conversation records to obtain a plurality of segmentation words;
obtaining, with the one or more processors, a probability that each of the plurality of segmentation words appears; and
determining, with the one or more processors, the word list space based on the probability that each of the plurality of segmentation words appears.

5. A computer device, comprising:
a processor;
a memory; and
computer programs stored in the memory and executable by the processor,
wherein the processor is configured to execute the computer programs to perform acts of:
converting chatting data inputted by a user into an input word sequence;
converting a tag of the user into a tag word sequence;
based on a preset encoding-decoding model with an attention model, predicting according to the input word sequence and the tag word sequence to obtain a target word sequence; and
converting the target word sequence into reply data of the chatting data;
wherein the processor is configured to, based on the preset encoding-decoding model with the attention model, predict according to the input word sequence and the tag word sequence to obtain the target word sequence by acts of:
encoding the input word sequence to obtain a first corpus sequence;
encoding the tag word sequence to obtain a reference corpus sequence;
determining a preset word in the first corpus sequence as an initial word;
determining first context information corresponding to the initial word based on the first corpus sequence;
determining second context information corresponding to the initial word based on the reference corpus sequence;
determining a target word based on the initial word, the first context information and the second context information; and
when the target word does not meet a cut-off condition, iterating by using the target word as the initial word to return acts of determining the first context information and determining the second context information; and
wherein the processor is configured to determine the target word based on the initial word, the first context information and the second context information by acts of:
inputting the initial word, the first context information and the second context information into the attention model to obtain hidden layer information;
projecting the hidden layer information into a word list space by linear transformation;
predicting a probability that a first word in the word list space is a next word, the first word being any one word in the word list space; and
determining the target word based on the probability.

6. The computer device according to claim 5,
wherein the processor is configured to determine the first context information corresponding to the initial word based on the first corpus sequence by acts of: determining first weight information corresponding to the initial word, and performing weighted sum on the first corpus sequence based on the first weight information;
wherein the processor is configured to determine the second context information corresponding to the initial word based on the reference corpus sequence by acts of: determining second weight information corresponding to the initial word, and performing weighted sum on the reference corpus sequence based on the second weight information.

7. The computer device according to claim 5, wherein the cut-off condition comprises:
the target word being a preset ending word; and/or,
the number of the target words that have been obtained reaching a preset length.

8. The computer device according to claim 7, wherein the processor is further configured to perform acts of:
  obtaining a plurality of conversation records;
  performing word segmentation on each of sentences in the plurality of conversation records to obtain a plurality of segmentation words;
  obtaining a probability that each of the plurality of segmentation words appears; and
  determining the word list space based on the probability that each of the plurality of segmentation words appears.

9. A non-transitory computer-readable storage medium, having computer programs stored therein, wherein when the computer programs are executed by a processor, a method for generating chatting data based on artificial intelligence is realized, the method comprising:
  converting chatting data inputted by a user into an input word sequence;
  converting a tag of the user into a tag word sequence;
  based on a preset encoding-decoding model with an attention model, predicting according to the input word sequence and the tag word sequence to obtain a target word sequence; and
  converting the target word sequence into reply data of the chatting data;
  wherein based on the preset encoding-decoding model with the attention model, predicting according to the input word sequence and the tag word sequence to obtain the target word sequence, comprises:
    encoding the input word sequence to obtain a first corpus sequence;
    encoding the tag word sequence to obtain a reference corpus sequence;
    determining a preset word in the first corpus sequence as an initial word;
    determining first context information corresponding to the initial word based on the first corpus sequence;
    determining second context information corresponding to the initial word based on the reference corpus sequence;
    determining a target word based on the initial word, the first context information and the second context information; and
    when the target word does not meet a cut-off condition, iterating by using the target word as the initial word to return acts of determining the first context information and determining the second context information; and
  wherein determining the target word based on the initial word, the first context information and the second context information, comprises:
    inputting the initial word, the first context information and the second context information into the attention model to obtain hidden layer information;
    projecting the hidden layer information into a word list space by linear transformation;
    predicting a probability that a first word in the word list space is a next word, the first word being any one word in the word list space; and
    determining the target word based on the probability.

10. The non-transitory computer-readable storage medium according to claim 9, wherein
  determining the first context information corresponding to the initial word based on the first corpus sequence, comprises: determining first weight information corresponding to the initial word, and performing weighted sum on the first corpus sequence based on the first weight information;
  determining the second context information corresponding to the initial word based on the reference corpus sequence, comprises: determining second weight information corresponding to the initial word, and performing weighted sum on the reference corpus sequence based on the second weight information.

11. The non-transitory computer-readable storage medium according to claim 9, wherein the cut-off condition comprises:
  the target word being a preset ending word; and/or,
  the number of the target words that have been obtained reaching a preset length.

12. The non-transitory computer-readable storage medium according to claim 9, wherein the method further comprises:
  obtaining a plurality of conversation records;
  performing word segmentation on each of sentences in the plurality of conversation records to obtain a plurality of segmentation words;
  obtaining a probability that each of the plurality of segmentation words appears; and
  determining the word list space based on the probability that each of the plurality of segmentation words appears.

* * * * *